United States Patent [19]
Murchie

[11] 3,771,509
[45] Nov. 13, 1973

[54] TRANSFER TABLE AND BASE STRUCTURE FOR SHAPING

[75] Inventor: John Ronald Murchie, Downsview, Ontario, Canada

[73] Assignee: True Tech Equipment Limited, Ontario, Canada

[22] Filed: Nov. 26, 1971

[21] Appl. No.: 202,106

[52] U.S. Cl. ............... 125/11 R, 51/134, 51/237 T
[51] Int. Cl. ......................... B25b 5/02, B24b 53/12
[58] Field of Search ............. 51/134, 237 R, 237 T, 51/108 R, 145 T; 269/20, 30; 279/1 E; 90/11 D; 125/11 R, 11 GA; 74/820

[56] References Cited
UNITED STATES PATENTS

| | | | |
|---|---|---|---|
| 1,708,569 | 4/1929 | Fotheringham | 51/237 T |
| 2,377,992 | 6/1945 | Carlson | 51/134 |
| 2,719,721 | 10/1955 | Grobey | 279/1 E |
| 3,025,646 | 3/1962 | Thompson | 51/237 R X |
| 3,372,951 | 3/1968 | McCash | 90/11 D |

FOREIGN PATENTS OR APPLICATIONS

| | | | |
|---|---|---|---|
| 12,890 | 4/1915 | Great Britain | 51/237 |

*Primary Examiner*—Harold D. Whitehead
*Assistant Examiner*—Nicholas P. Godici
*Attorney*—David M. Rogers et al.

[57] ABSTRACT

In a machine for shaping workpieces such as abrasive wheels, a transfer table is rotatably mounted on a base. Rotatably mounted in the transfer table are four collets for holding workpieces. Each collet is biased to a rear position by a spring acting against a push rod connected to each collet. The transfer table is rotated in 90° increments and is located between turns by a plunger fixed to the base and moveable forwardly to engage a depression in the rear surface of the push rod located in front of the plunger. The plunger moves forward sufficiently not only to locate the transfer table but also to push the push rod and collet forwardly to open the collet and free the workpiece therein. Air is injected through the plunger and push rod to clear the collet. The remaining collets are spun by resilient gears connected thereto and which, as the transfer table turns to an indexed position, move into mesh with rotating resilient gears mounted on the base. The gears have teeth and roots of circular profile to facilitate meshing.

11 Claims, 6 Drawing Figures

PATENTED NOV 13 1973 3,771,509

PATENTED NOV 13 1973 3,771,509

TRANSFER TABLE AND BASE STRUCTURE FOR SHAPING

This invention relates to a machine for shaping workpieces, typically abrasive wheels.

Abrasive wheels are widely used in work shops, machine shops and the like, and are therefore required in substantial quantities. Abrasitve wheels are commonly produced manually, by a workman who shapes a workpiece until it matches a template. Some automatic machines are available for producing abrasive wheels, but such machines are generally extremely complicated and expensive.

Accordingly, it is an object of the present invention to provide a simplified machine for shaping abrasive wheels, which machine is relatively simple to operate and relatively uncomplicated and inexpensive. In a preferred embodiment of the invention, a machine is provided having a rotatable transfer table mounted to rotate on a base located behind the transfer table. The transfer table contains a number of collets, each of which can hold a workpiece to be formed into an abrasive wheel. Each collet is biased to a rear position in which it clamps the workpiece tightly. A plunger is provided at a loading and unloading position on the base and moves forwardly after each partial rotation of the transfer table to enter a depression in the rear surface of a push rod attached to the collet. This holds the transfer table against further rotation and at the time it pushes the collet forwardly to release the workpiece therein, so that the workpiece can be removed and a new workpiece inserted. Compressed air is preferably supplied through conduits in the plunger and push rod to the collet, to clear the collet of abrasive particles and to assist in ejecting the workpiece. The machine may also be used to shape articles other than abrasive wheels.

In its preferred embodiment, the invention includes a flexible gear connected to each collet, and a further flexible gear on the base associated with each collet except the collet at the loading and unloading position. As the transfer table is rotated into an indexed position, the flexible gears on the base mesh with the flexible gears connected to the collets, to rotate all of the collets except the collet at the loading and unloading station. The gears are made of resilient material such as polyurethane and preferably have both teeth and roots having a circular profile, so that the gears can roll into each other as they mesh. This allows one power source to rotate all of the collets and ensures that all the workpieces will rotate at the same speed.

Further objects and advantages of the invention will appear from the following description, taken together with the accompanying drawings, in which.

Figure 1:
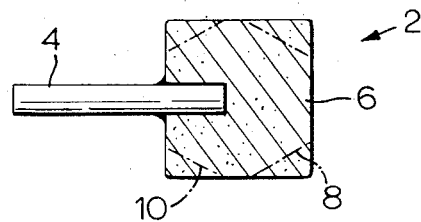
FIG. 1 is a sectional view showing a workpiece with which the present invention may typically be used.

Reference is first made to FIG. 1, which shows a workpiece 2 of the type with which the invention is typically concerned. The workpiece 2, which is to be formed into an abrasive wheel of the kind known as a mounted point abrasive wheel, contains a shaft 4 embedded in and secured to a cylindrical mass 6 of ceramic abrasive material. The workpiece 2 is typically to be formed into a spherical (i.e., ball-shaped) abrasive wheel, and this is accomplished by rotating the workpiece 2 about its axis and moving a cutting wheel along line 8 to perform a first rough shaping operation, then (while continuing to rotate the workpiece 2) moving a cutting wheel along a second line 10 to perform a second rough shaping operation, and finally (while still rotating the workpiece 2) employing a finishing cutting wheel to perform the final shaping of the workpiece into a spherical abrasive wheel.

Figure 2:
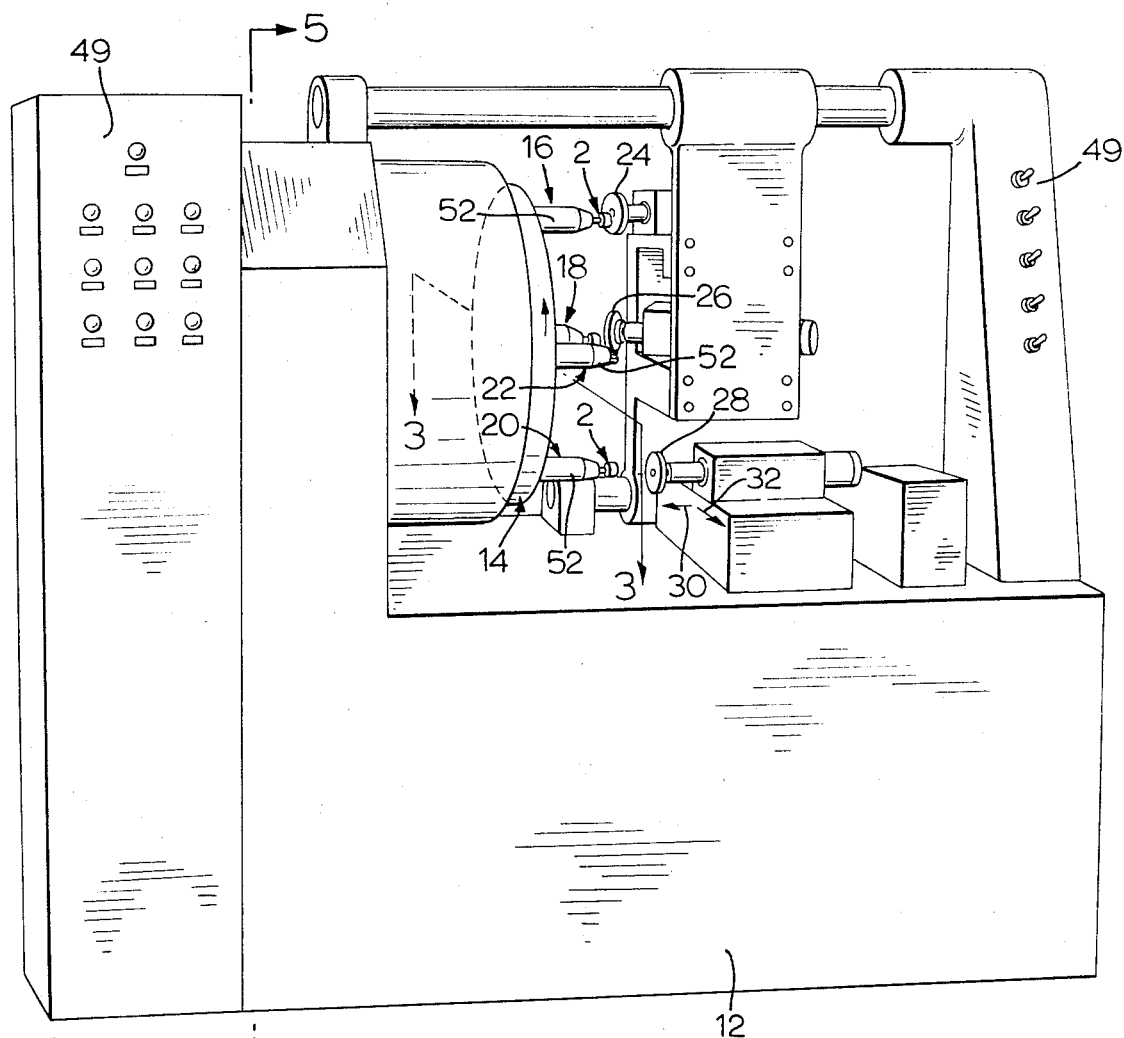
FIG. 2 is a perspective view of a machine according to the invention.

Reference is next made to FIG. 2, which shows a machine according to the invention for performing these functions. The machine includes a main body structure 12 on which is rotatably mounted a transfer table 14. The machine has three work stations 16, 18, 20 and a loading and unloading station 22. A workpiece 2 is shown at each work station except station 22, where the workpiece is omitted for clarity of illustration.

Work stations 16 and 18 are "roughing" work stations. At station 16, a cutting wheel 24 is moved, by means not shown, across the workpiece 2 at an angle to the axis of the workpice, to cut the workpiece along line 8 of FIG. 1. At station 18, another cutting wheel 26 is moved at an angle to the axis of the workpiece to cut it along line 10 of FIG. 1. At station 20, a finishing cutting wheel 28 is moved in the direction of arrow 30, with an appropriate component of movement in the direction of arrow 32 as governed by a template, to impart the required finished spherical shape to the workpiece 2. While these functions are being performed at stations 16, 18 and 20, the operator unloads a finished workpiece at station 22 and loads a new workpiece into the machine at this point.

Conventional pistons and cylinders are used to move cutting wheels 24, 26 in a straight line in the desired direction, and conventional pistons and cylinders are used to impart 2° of motion to cutting wheel 28 in the direction of arrows 30, 32. This portion of the machine is entirely conventional; it is the structure of the transfer table and its base with which the present invention is concerned.

Figure 3:
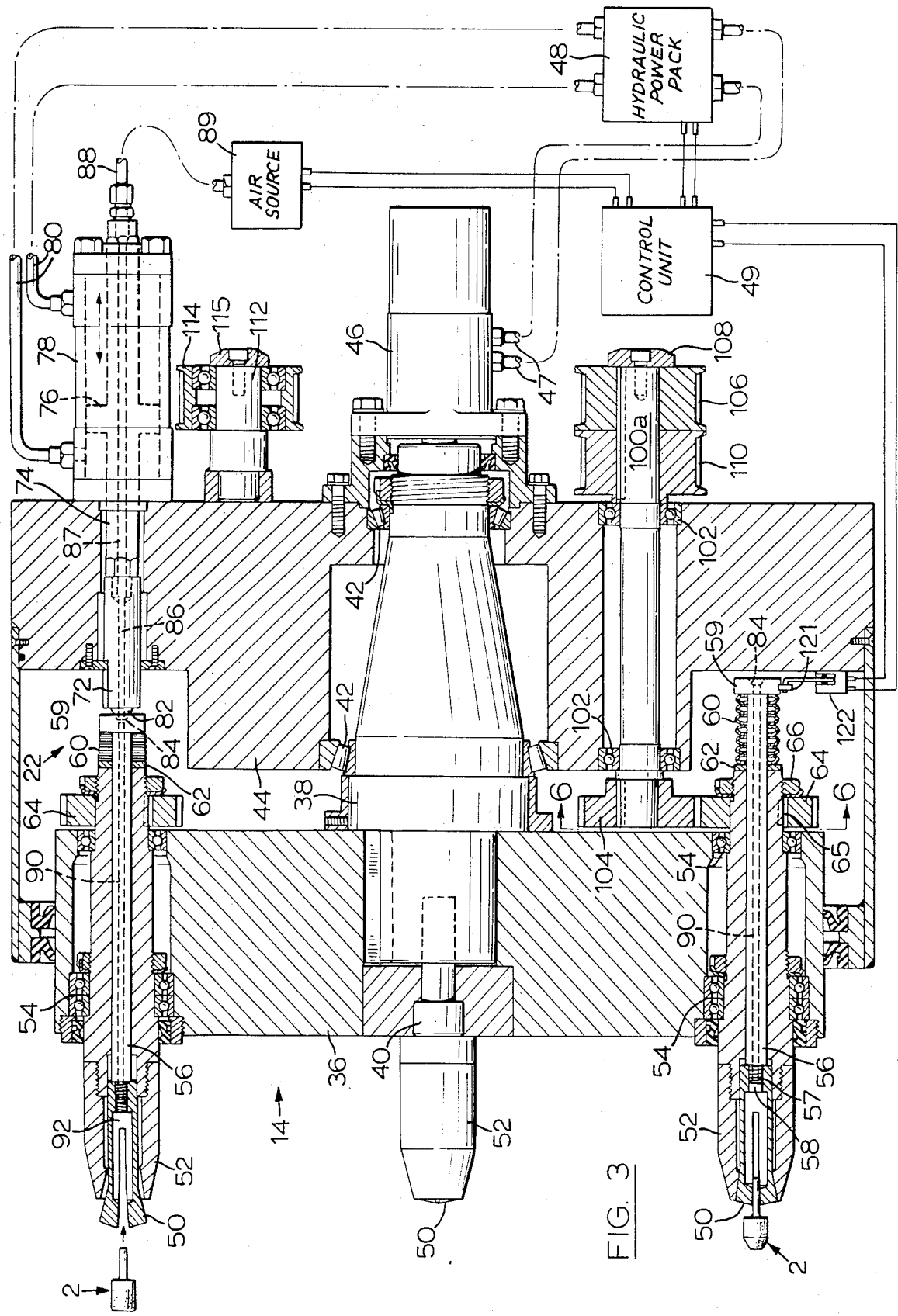
FIG. 3 is a sectional view taken along lines 3—3 of FIG. 2.
Figure 4:
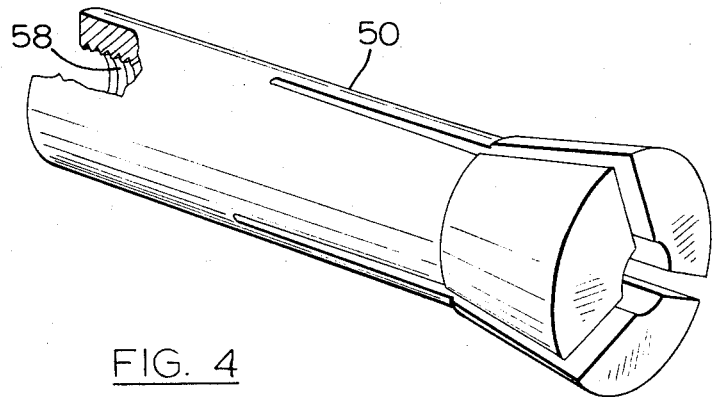
FIG. 4 is a perspective view of a collet used in the machine of the invention; workpiece.
Figure 5:
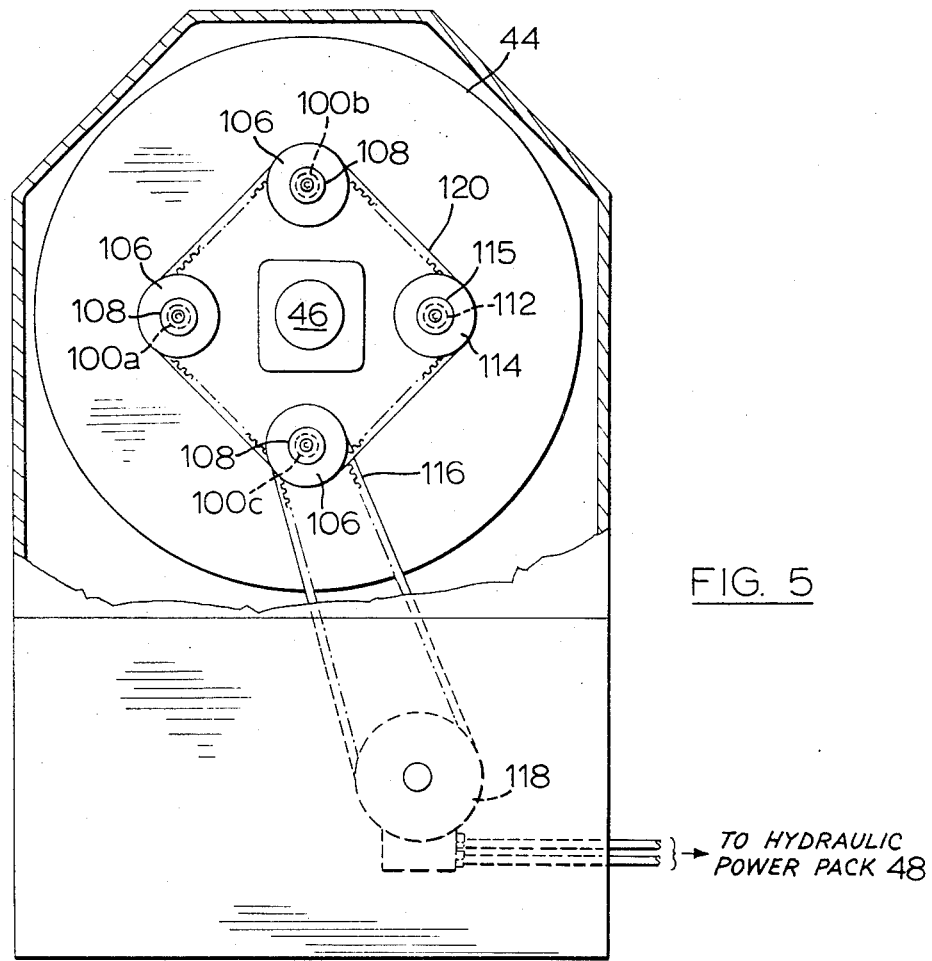
FIG. 5 is a view taken along line 5—5 of FIG. 2.

Reference is next made to FIGS. 3 to 5, which illustrate the transfer table 14 and its associated structure. As shown in FIG. 3, the transfer table includes a large metal disc 36 having an axial shaft 38 secured thereto by a cap-screw 40. The shaft 38 is mounted by bearings 42 in a base 44 located behind the transfer table, and the shaft 38 and disc 36 are rotated relative to the base by a hydraulic motor 46 secured to the base. Hydraulic fluid for the motor is supplied by conduits 47 connected to a hydraulic power pack 48 whih in turn is controlled by a control unit 49.

The transfer table 36 includes four collets 50 spaced at 90° intervals in a circular pattern around the axis of the transfer table. (A collet 50 is also shown in FIG. 4.) Each collet 50 is accommodated in a housing 52 (also shown in FIG. 2) which is journalled for rotation in the transfer table by bearings 54.

A push rod 56 is secured to the rear end of each collet 50 by means of a threaded portion 57 at the front of each push rod. Each threaded portion 57 extends into a corresponding threaded socket 58 at the rear of its associated collet. Each push rod 56 extends rearwardly, out the rear end of the collet housing and has at its rear end an end plate 59 integrally secured thereto. The plate 59 forms a stop for a series of disc springs 60 which are placed on the projecting portion of push rod 56 and abut at its front end against a thrust plate 62 located against the rear end of the collet housing 52. The springs 60 bias the collet rearwardly into its housing, so that the collet grips the shaft 4 of the workpiece 2 firmly. The collet is made of spring metal so that when the push rod 56 is pushed forwardly, the collet opens slightly as shown in FIG. 4 (and at the top collet 50 in FIG. 3) releasing its grip on the workpiece shaft. Disc springs 60 are used instead of a coil spring, because about 3,000 pounds of clamping force is typically desired at the collet, requiring an 1,100 pound pull on push rod 56, and such a force can best be obtained with disc springs.

At the rear of each collet housing 52, there is provided a polyurethane gear 64 (FIG. 3). The gear 64 is mounted on the collet housing 52, coaxial therewith, keyed thereto by a key 65 (FIG. 6) and is secured to the collet housing by a nut 66. The gear 64 is provided so that the collet and workpiece therein may be spun when the transfer table is in a selected position.

At the unloading station 22, the base 44 is fitted with a plunger 72 secured to the piston rod 74 of a double acting piston 76. Piston 76 is located in a conventional hydraulic cylinder 78 having conduits 80 at each end thereof so that the piston 76 may be driven either forwardly or rearwardly in a direction parallel with the axis of the transfer table.

The plunger 72 includes a truncated conical tip 82 which, when the plunger is moved forwardly to the position shown in the drawing, engages a similarly shaped conical depression 84 in the end plate 59 of a push rod located in front of the plunger. Thus, the plunger 72 serves a dual function: firstly, it pushes forward the push rod 56, thereby moving the collet 50 present at the loading and unloading station forwardly and opening it to free the workpiece, and secondly, it locates and holds the transfer table against rotation.

In addition, the plunger 72 is provided with an axial air passage 86. Passage 86 extends into a corresponding passage 87 which extends through the piston rod 74 to the rear end of the piston rod. The rear end of the piston rod 74 is connected to a flexible hose 88, which is in turn connected to a compressed air supply 89 controlled by the control unit 49. Each time the push rod 72 is moved forwardly to release a workpiece, the control unit 49 operates a valve (not shown) in the air supply 89 to inject a blast of compressed air through the conduits 87, 86. The compressed air is conducted from passage 86 through a corresponding passage 90 in the push rod 56 into a space 92 inside the collet 50. There, the compressed air surges out of the collet, assisting to eject the workpiece 2 and also clearing away abrasive particles which otherwise would tend to accumulate and interfere with the true clamping of the next workpiece. This is therefore a third function of the push rod 72, i.e., in addition to releasing the collet and locating the transfer table, it also acts as a disconnectable coupling to admit compressed air to the collet.

The means by which the collets at the work stations are rotated, without rotating the collet at the loading and unloading station, will next be described. For this purpose, the base 44 in which the transfer table is journalled includes three shafts 100a, 100b, 100c (see also FIG. 5), one shaft associated with each work station. Each shaft 100a, 100b, 100c is journalled by bearings 102 in the base 44 and includes at its foward end a resilient polyurethane gear 104 located in a position to mesh with the gear 64 on a collet when the transfer table is turned to an appropriate position. At its rearward end, each shaft 100a, 100b, 100c includes a conventional gear 106 keyed on the shaft and held thereto by a cap-screw 108. The shaft 100a also includes a second rear gear 100 positioned just ahead of gear 106. In addition, the transfer table base 44 is provided with a fourth shaft 112 located beside the loading and unloading station 22. A conventional idler gear 114 is secured to shaft 112 by a cap-screw 115.

The gear 110 on shaft 100a is driven by a timing belt 116 (FIG. 5) which extends to a motor drive unit 118, and the three gears 106 on the three shafts 100a, 100b, 100c, and the gear 114 on the shaft 112, are all connected by a second timing belt 120 (FIG. 5).

The overall operation of the machine is as follows. Assume that the operator has placed a workpiece 2 in the collet 50 at the loading and unloading station 22. When the machine has completed its functions on the workpieces at the roughing and finish work stations 16, 18, 20 (FIG. 2), the control unit 49, which is connected (by conventional means not shown) to the actuators for cutting wheels 24, 26 and 28, detects in a conventional manner that these cutting wheels have completed their traverse and actuates the hydraulic power pack 48, which causes the hydraulic motor 46 to index or rotate the transfer table 14 to the next position. The transfer table 14 rotates through 90°, until the end plate 59 of a push rod 56 engages the actuator 121 (FIG. 3) of a microswitch 122 secured to the base 44. The microswitch 122 signals the control unit 49, which then causes the hydraulic power pack to terminate operation of the hydraulic motor 46 and causes hydraulic fluid to be injected into the right hand conduit 80, moving the piston 76 to the left as drawn in FIG. 3. This propels the plunger 72 into the depression 84 of the push rod 56 of the upper collet, thus locating and holding the transfer table in its indexed position. As the plunger 72 continues to move forwardly, it moves the upper collet to the left or forwardly, releasing the workpiece clamped in the upper collet 50. At the same time, the control unit 49 triggers the air source 89 which releases a blast of compressed air into the upper collet 50 as described.

When the transfer table 14 is in an indexed position, in which the push rod 72 locates and holds the transfer table against further rotation, the gears 64 of the three collets located at the work stations are meshed with the gears 104 of the three shafts 100a, 100b, 100c. Since the shafts 100a, 100b, 100c are rotated by drive unit 118, the three collets at the work stations will thus all be rotated at the same speed (typically 1,000 to 2,200 RPM). Normally, during rotation of the transfer table between index positions, the control unit 49 will (by conventional means not shown) operate the hydraulic power pack to de-energize the drive unit 118, so that the gears 104 are not rotated rapidly during meshing.

Figure 6:
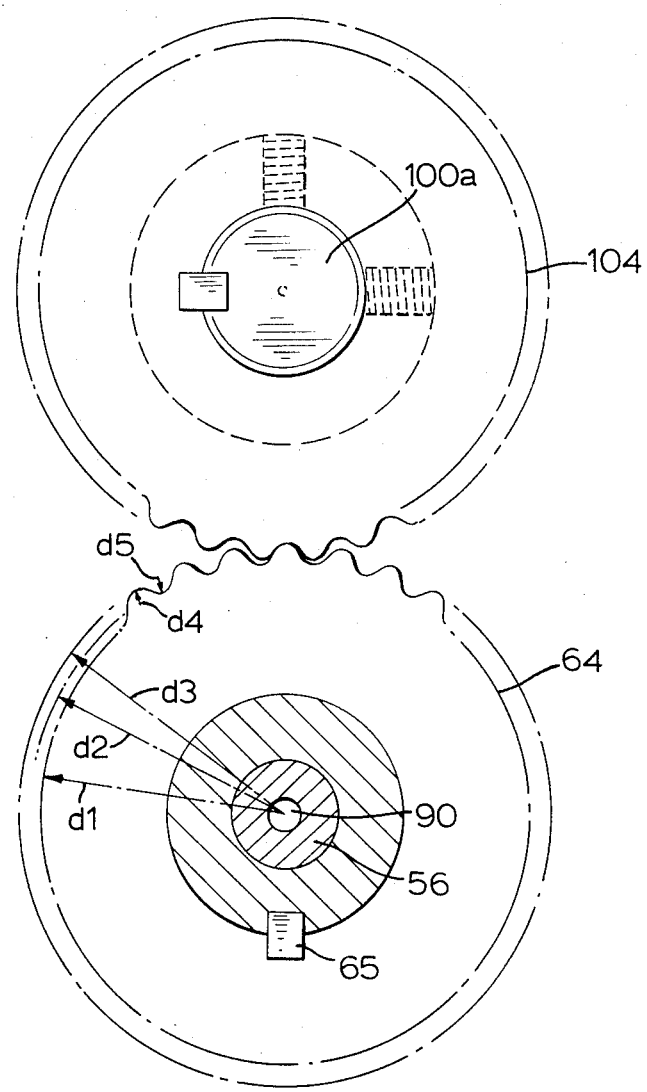
FIG. 6 is a view of gears used in the machine according to the invention, taken along line 6—6 of FIG. 2.

A useful feature of the present invention is the construction of the gears 104, 64, which will now be described with reference to FIG. 6. It has been found that metal gears will not mesh properly when the transfer table is indexed, and metal gears in the arrangement shown are therefore inoperative. An attempt was made to use friction wheels, but it was found that the friction wheels heated unduly due to flexing (since considerable pressure is required to transfer enough power to rotate the collets at the required speed), and in addition the friction wheels absorbed too much power. However, it was found that the use of resilient gear wheels with large circular teeth allowed smooth meshing of gears when the transfer table is rotated. The circular profile of the teeth and of the spaces between the teeth ensures that the gears will roll into each other as the transfer table is rotated to an indexed position, and because the material used is resilient, any mispositioning of the gears as they are meshed is easily accommodated.

In a preferred embodiment of the invention, the material used was polyurethane of hardness given by 85 durometer C-shore. Each gear 104, 64 had a root circle radius $d1$ of 1.662 inches, a pitch circle radius $d2$ of 1.750 inches, and an outside circle radius $d3$ of 1.831 inches. The radius $d4$ of the tips of the teeth was 0.081 inches, and the radius $d5$ of the roots of the teeth was 0.103 inches, resulting in 30 teeth for the gear wheels. It is found that the relatively large teeth used facilitates meshing of the gears.

If desired, separate drive means could be used at each collet. However, it is usually desirable that each collet be spun at the same speed, and the arrangement shown ensures that this will be accomplished, and in addition it eliminates the need for a separate control that would otherwise be needed to ensure that the collet at the loading and unloading station is not rotated.

What I claim is:

1. In a machine for shaping workpieces:
   a. a transfer table,
   b. a fixed base for said transfer table,
   c. means mounting said transfer table on said base for rotation about an axis of said transfer table, and means for rotating said transfer table about said axis,
   d. said transfer table having a plurality of workpiece holding stations spaced in a circular pattern around the axis of said transfer table, each said station comprising:
      1. a collet housing, and means mounting said collet housing in said transfer table,
      2. a collet mounted in said housing for forward movement in said housing to open said collet to release a workpiece and for rearward movement in said housing to clamp a workpiece,
      3. a push rod connected to the rear of said collet to move said collet forwardly and rearwardly in said housing, said push rod having a rear surface,
      4. means biasing said collet and said push rod to a rearward position, so that said collet is normally retracted in said housing to clamp a workpiece,
   e. said base having a loading and unloading station comprising:
      1. a plunger having a forward tip, said tip and said rear surface of each push rod having co-operating detent means preventing rotation of said transfer table when said tip is engaged with the rear surface of a said push rod,
      2. means mounting said plunger for forward and rearward movement, in a position such that the rear surfaces of said push rods move in front of the tip of said plunger as said transfer table is rotated, so that said tip may be moved forwardly to engage the rear surface of a push rod positioned in front of said plunger,
      3. means for moving said plunger forwardly when the rear surface of a said push rod is aligned with said plunger, for said tip of said plunger to engage the rear surface of such push rod and then to push such push rod forwardly, whereby said plunger both locates said transfer table relative to said base and opens said collet at said housing loading and unloading station,
      4. means for moving said plunger rearwardly out of engagement with such push rod, whereby to close the collet of such push rod and to free said transfer table for rotation,
      5. said tip of said plunger including an opening therein, said plunger including a passage therethrough from said opening to a position at the rear of said plunger,
      6. means connected to said rear of said plunger for admitting compressed air to said passage,
   f. each said push rod including an opening in its rear surface co-operating with said opening in said tip of said plunger, and a passage from said opening in said rear surface extending to said collet, whereby compressed air can be introduced through said plunger and said push rod into said collet to clear said collet of particles and to expedite removal of said workpiece, when said plunger is located in the depression of such push rod.

2. Apparatus according to claim 1 wherein said means mounting said collet housings in said transfer table includes bearing means permitting rotation of each said collet housing about its own axis in said transfer table, said apparatus further including means operative, when a said push rod is aligned with said plunger, for rotating each collet, except the collet the push rod of which is aligned with said plunger.

3. Apparatus according to claim 2 wherein said means for rotating said collets includes:
   f. a resilient gear mounted at the rear of each collet housing and coaxial with its associated housing, for rotation therewith,
   g. a plurality of second gears, one less in number than the number of collets, and means mounting said second gears on said base in a position such that when the tip of said plunger is aligned with said depression of a selected collet, said second gears of said base mesh with said first gears of said remaining collets,
   h. and means for rotating said second gears thus to rotate said first gears of the collets other that the collet located at said loading and unloading station, whereby to rotate said workpieces except the workpieces at said loading and unloading station.

4. Apparatus according to claim 3 wherein said first and second gears are of a resilient compressible material, said first and second gears each having relatively large teeth, said teeth having circular profiles and the grooves between said teeth having circular profiles, thus to facilitate meshing of said gears.

5. Apparatus according to claim 4 wherein said gears are polyurethane.

6. Apparatus according to claim 3 wherein said transfer table is circular in outline and includes four said collets spaced at 90° intervals therearound, said second gears thus being three in number and also being spaced at 90° intervals around said base.

7. Apparatus according to claim 4 wherein the height of said teeth from their tips to their root spaces is approximately 0.155 inches, the spacing of said teeth from the centre of the tip of one tooth to the centre of the tip of another tooth along their outside circle is approximately 0.375 inches, the radius of the tips of said teeth is 0.081 inches, and the radius of said roots is approximately 0.103 inches.

8. Apparatus according to claim 4 wherein the height of said teeth from their tips to their root spaces is approximately 0.155 inches, the spacing of said teeth from the centre of the tip of one tooth to the centre of the tip of another tooth along their outside circle is approximately 0.375 inches, the radius of the tips of said teeth is 0.081 inches, and the radius of said roots is approximately 0.103 inches, the pitch diameter of said gear being approximately 3.5 inches and said teeth being 30 in number.

9. Apparatus according to claim 1 wherein each said push rod includes a plate at its rear end, the rear surface of said plate constituting the rear end of each push rod, said detent means comprising a depression in each said plate, the tip of said plunger being shaped to fit snugly within a said depression, said means (4) comprising for each station a plurality of disc springs encircling said push rod at the rear thereof and restrained between said plate and said collet housing.

10. In a machine for shaping workpieces:
   a. a transfer table,
   b. a fixed base for said transfer table,
   c. means mounting said transfer table on said base for rotation about an axis of said transfer table, and means for rotating said transfer table about said axis,
   d. said transfer table having a plurality of workpiece holding stations spaced in a circular pattern around the axis of said transfer table, each said station comprising:
      1. a collet housing, and means mounting said collet housing in said transfer table,
      2. a collet mounted in said housing for forward movement in said housing to open said collet to release a workpiece and for rearward movement in said housing to clamp a workpiece,
      3. push means connected to the rear of said collet to move said collet forwardly and rearwardly in said housing,
   e. said base having a loading and unloading station located for alignment with successive collets as said transfer table is rotated about its axis, said loading and unloading station including means cooperating with said push means for opening a collet aligned with said loading and unloading station,
   f. said means mounting said collet housings in said transfer table including bearing means permitting rotation of each said collet housing about its own axis in said transfer table,
   g. and drive means operative, when a said collet is aligned with said loading and unloading station, for rotating each collet except the collet aligned with said loading and unloading station, said drive means comprising
      i. a first gear mounted at the rear of each collet housing and coaxial with its associated housing, for rotation therewith,
      ii. a plurality of second gears, one less in number than the number of collets, and means mounting said second gears on said base in a position such that when said loading and unloading station is aligned with a selected collet, said second gears of said base mesh with said first gears of said remaining collets,
      iii. and means for rotating said second gears thus to rotate said first gears of the collets other than the collet located at said loading and unloading station, whereby to rotate said workpieces except the workpiece at said loading and unloading station,
      iv. said first and second gears being of a resilient compressible material, said first and second gears each having relatively large teeth, said teeth having circular profiles and the grooves between said teeth having circular profiles, thus to facilitate meshing of said gears.

11. Apparatus according to claim 10 wherein said material is polyurethane.

* * * * *